US011037440B2

(12) United States Patent
Georgis

(10) Patent No.: US 11,037,440 B2
(45) Date of Patent: Jun. 15, 2021

(54) VEHICLE IDENTIFICATION FOR SMART PATROLLING

(71) Applicant: Sony Corporation, Tokyo (JP)

(72) Inventor: Nikolaos Georgis, San Diego, CA (US)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 16/226,234

(22) Filed: Dec. 19, 2018

(65) Prior Publication Data
US 2020/0202709 A1 Jun. 25, 2020

(51) Int. Cl.
G08G 1/017 (2006.01)
G08G 1/054 (2006.01)
G06K 9/00 (2006.01)
G06K 9/32 (2006.01)

(52) U.S. Cl.
CPC ....... G08G 1/0175 (2013.01); G06K 9/00825 (2013.01); G06K 9/3241 (2013.01)

(58) Field of Classification Search
CPC . G08G 1/0175; G06K 9/00825; G06K 9/3241
See application file for complete search history.

(56) References Cited

U.S. PATENT DOCUMENTS

| | | | | |
|---|---|---|---|---|
| 9,643,722 | B1* | 5/2017 | Myslinski | G06K 9/00711 |
| 10,157,364 | B1* | 12/2018 | Koeppel | G06Q 10/083 |
| 10,169,995 | B2* | 1/2019 | Bostick | G08G 1/144 |
| 2014/0301597 | A1* | 10/2014 | Xu | G06K 9/00832 |
| | | | | 382/103 |
| 2015/0179062 | A1* | 6/2015 | Ralston | G08G 1/0145 |
| | | | | 701/117 |
| 2016/0078759 | A1* | 3/2016 | Nerayoff | G06T 7/248 |
| | | | | 701/3 |
| 2017/0036601 | A1* | 2/2017 | Kimura | B60R 1/00 |
| 2017/0103265 | A1* | 4/2017 | Channah | G06K 9/00771 |
| 2017/0187952 | A1* | 6/2017 | Okada | F16M 11/105 |
| 2017/0193828 | A1* | 7/2017 | Holtzman | G06Q 50/30 |
| 2017/0243067 | A1* | 8/2017 | Bulan | G06K 9/00832 |
| 2017/0301051 | A1* | 10/2017 | Gauglitz | G06Q 50/01 |
| 2017/0319426 | A1* | 11/2017 | Dayal | H04W 4/024 |
| 2018/0211117 | A1* | 7/2018 | Ratti | G06K 9/00785 |
| 2018/0211406 | A1* | 7/2018 | Tian | G06T 7/0004 |
| 2018/0265149 | A1* | 9/2018 | Park | B62D 65/06 |
| 2018/0268238 | A1* | 9/2018 | Khan | G06F 16/583 |

(Continued)

FOREIGN PATENT DOCUMENTS

CN 107729818 A * 2/2018

OTHER PUBLICATIONS

Chavez-Aragon et al., Vision-Based Detection and Labelling of Multiple Vehicle Parts, Oct. 5-7, 2011.*

(Continued)

Primary Examiner — Quang Pham
(74) Attorney, Agent, or Firm — Trellis IP Law Group, PC

(57) ABSTRACT

Implementations generally relate to identification of a vehicle for smart patrolling. In some implementations, a method includes detecting a vehicle with a camera. The method further includes capturing a plurality of images of the vehicle. The method further includes determining a plurality of vehicle features from each image of the plurality of images. The method further includes generating a vehicle identification for the vehicle based at least in part on some of the plurality of vehicle features.

20 Claims, 5 Drawing Sheets

(56) References Cited

U.S. PATENT DOCUMENTS

| | | | | |
|---|---|---|---|---|
| 2018/0293552 | A1* | 10/2018 | Zhang | G06K 9/00664 |
| 2018/0293806 | A1* | 10/2018 | Zhang | G06N 3/0454 |
| 2018/0330172 | A1* | 11/2018 | Lee | G01C 21/206 |
| 2019/0047382 | A1* | 2/2019 | Glatfelter | B60J 3/02 |
| 2019/0050697 | A1* | 2/2019 | Meng | G06K 19/07749 |
| 2019/0051142 | A1* | 2/2019 | Wiles | G08B 25/08 |
| 2019/0051165 | A1* | 2/2019 | Harer | G08G 1/0175 |
| 2019/0108384 | A1* | 4/2019 | Wang | G06T 7/194 |
| 2019/0108700 | A1* | 4/2019 | Chelnik | G06Q 30/0284 |
| 2019/0130671 | A1* | 5/2019 | Dillow | G07C 5/0841 |
| 2019/0139262 | A1* | 5/2019 | Wang | G06K 9/00771 |
| 2019/0299980 | A1* | 10/2019 | Harai | B60G 17/0195 |
| 2019/0392543 | A1* | 12/2019 | Bautista | H04W 4/40 |
| 2020/0007810 | A1* | 1/2020 | Hoevenaar | H04N 5/44504 |
| 2020/0072943 | A1* | 3/2020 | Laur | G01S 7/411 |
| 2020/0084193 | A1* | 3/2020 | Beaurepaire | H04L 63/105 |
| 2020/0118288 | A1* | 4/2020 | Huang | G01C 21/00 |
| 2020/0132502 | A1* | 4/2020 | Beaurepaire | G01C 21/3602 |
| 2020/0143546 | A1* | 5/2020 | Mehdi | G06T 7/248 |
| 2020/0160054 | A1* | 5/2020 | Rogan | G06K 9/00214 |

OTHER PUBLICATIONS

Chiu et al., Real Time Recognition and Tracking System of Multiple Vehicles, Jun. 13-15, 2006.*

Alfasly et al., Variational Representation Learning for Vehicle Re-Identification (Year: 2019).*

Chen et al., Vehicle Color Recognition on Urban Road by Feature Context (Year: 2014).*

Naseer et al., Vehicle Make and Model Recognition using Deep Transfer Learning and Support Vector Machines (Year: 2020).*

Vijayalakshmi et al., Design of Algorithm for Vehicle Identification by Number Plate Recognition (Year: 2012).*

Wang et al., A Survey of Vehicle Re-Identification Based on Deep Learning (Year: 2019).*

Wang et al., Discriminative Feature and Dictionary Learning with Part-aware Model for Vehicle Re-identification (Year: 2020).*

Zhao et al., Structural Analysis of Attributes for Vehicle Re-Identification and Retrieval (Year: 2020).*

Hongye Liu et al.; "Deep Relative Distance Learning: Tell the Difference Between Similar Vehicles"; "https://www.cv-foundation.org/openaccess/content_cvpr_2016/html/Liu_Deep_Relative_Distance_CVPR_2016_paper_html https://www.cv-foundation.org/openaccess/content_cvpr_2016/papers/Liu_Deep_Relative_Distance_CVPR_2016_paper.pdf"; -9 pages.

Yantao Shen et al.; "Learning Deep Neural Networks for Vehicle Re-ID with Visual-spatio-temporal Path Proposals"; https://arxiv.org/pdf/1708.03918.pdf—1 pages.

Zapletal Dominik et al: "Vehicle Re-identification for Automatic Video Traffic Surveillance", 2016 IEEE Conference on Computer Vision and Pattern Recognition Workshops (CVPRW), IEEE, Jun. 26, 2016 (Jun. 26, 2016), pp. 1568-1574, XP033027991, DOI: 10.1109/CVPRW.2016.195 [retrieved on Dec. 16, 2016].

Wang Zhongdao et al: "Orientation Invariant Feature Embedding and Spatial Temporal Regularization for Vehicle Re-identification", 2017 IEEE International Conference on Computer Vision, (ICCV), IEEE, Oct. 22, 2017 (Oct. 22, 2017), pp. 379-387, XP033282892, DOI: 10.1109/ICCV.2017.49 [retrieved on Dec. 22, 2017].

Liu Xiaobin et al: "RAM: A Region-Aware Deep Model for Vehicle ReIdentification", 2018 IEEE International Conference on Multimedia and Expo (ICME), IEEE, Jul. 23, 2018 (Jul. 23, 2018), pp. 1-6, XP033417665, DOI: 10.1109/ICME.2018.8486589 [retrieved on Oct. 8, 2018].

Sultan Daud Khan et al: "A survey of advances in vision-based vehicle re-identification", arxiv.org, Cornell University Library, 201 Olin Library Cornell University Ithaca, NY 14853, May 30, 2019 (May 30, 2019), XP081366205, DOI: 10.1016/J.CVIU.2019.03.001.

* cited by examiner

VEHICLE IDENTIFICATION FOR SMART PATROLLING

BACKGROUND

In law enforcement, a typical workflow when following offender cars may include performing automated license plate recognition, which can be difficult due to lack of visibility. For example, the camera may be located overhead (e.g., aerial camera) or a license plate may be occluded by other cars. Conventional computer vision object detectors may be used to track a car, which becomes difficult when an object detector loses visibility of the car. Conventional techniques are inefficient and inaccurate, which produce poor results.

SUMMARY

Implementations generally relate to identification of a vehicle for smart patrolling. In some implementations, a system includes one or more processors, and includes logic encoded in one or more non-transitory computer-readable storage media for execution by the one or more processors. When executed, the logic is operable to perform operations including detecting a vehicle with a camera; capturing a plurality of images of the vehicle; determining a plurality of vehicle features from each image of the plurality of images; and generating a vehicle identification for the vehicle based at least in part on some of the plurality of vehicle features.

With further regard to the system, in some implementations, the plurality of vehicle features includes one or more top-view features. In some implementations, the plurality of vehicle features includes one or more side-view features. In some implementations, the plurality of vehicle features includes one or more front-view features. In some implementations, the plurality of vehicle features includes one or more rear-view features. In some implementations, each feature includes one or more characteristics, and where at least one of the characteristics includes shape. In some implementations, each feature includes one or more characteristics, and where at least one of the characteristics includes color.

In some implementations, a non-transitory computer-readable storage medium with program instructions thereon is provided. When executed by one or more processors, the instructions are operable to cause the one or more processors to perform operations including detecting a vehicle with a camera; capturing a plurality of images of the vehicle; determining a plurality of vehicle features from each image of the plurality of images; and generating a vehicle identification for the vehicle based at least in part on some of the plurality of vehicle features.

With further regard to the computer-readable storage medium, in some implementations, the plurality of vehicle features includes one or more top-view features. In some implementations, the plurality of vehicle features includes one or more side-view features. In some implementations, the plurality of vehicle features includes one or more front-view features. In some implementations, the plurality of vehicle features includes one or more rear-view features. In some implementations, each feature includes one or more characteristics, and where at least one of the characteristics includes shape. In some implementations, each feature includes one or more characteristics, and where at least one of the characteristics includes color.

In some implementations, a method includes detecting a vehicle with a camera. The method further includes capturing a plurality of images of the vehicle. The method further includes determining a plurality of vehicle features from each image of the plurality of images. The method further includes generating a vehicle identification for the vehicle based at least in part on some of the plurality of vehicle features.

With further regard to the method, in some implementations, the plurality of vehicle features includes one or more top-view features. In some implementations, the plurality of vehicle features includes one or more side-view features. In some implementations, the plurality of vehicle features includes one or more front-view features. In some implementations, the plurality of vehicle features includes one or more rear-view features. In some implementations, each feature includes one or more characteristics, and where at least one of the characteristics includes shape.

A further understanding of the nature and the advantages of particular implementations disclosed herein may be realized by reference of the remaining portions of the specification and the attached drawings.

DETAILED DESCRIPTION

Implementations described herein enable and facilitate identification of a vehicle for smart patrolling. Implementations enable smart patrolling in that a system detects and follows an individual vehicle from multiple viewpoints, one or more cameras, etc. Implementations also enable smart patrolling in that a system detects and follows multiple vehicles in one or more geographic areas. The system efficiently tracks selected cars with high accuracy and speed.

In some implementations, a system detects a vehicle with a camera. The system captures multiple images of the vehicle. The system also determines vehicle features from each image. The system then generates a vehicle identification for the vehicle based on the vehicle features.

Figure 1:
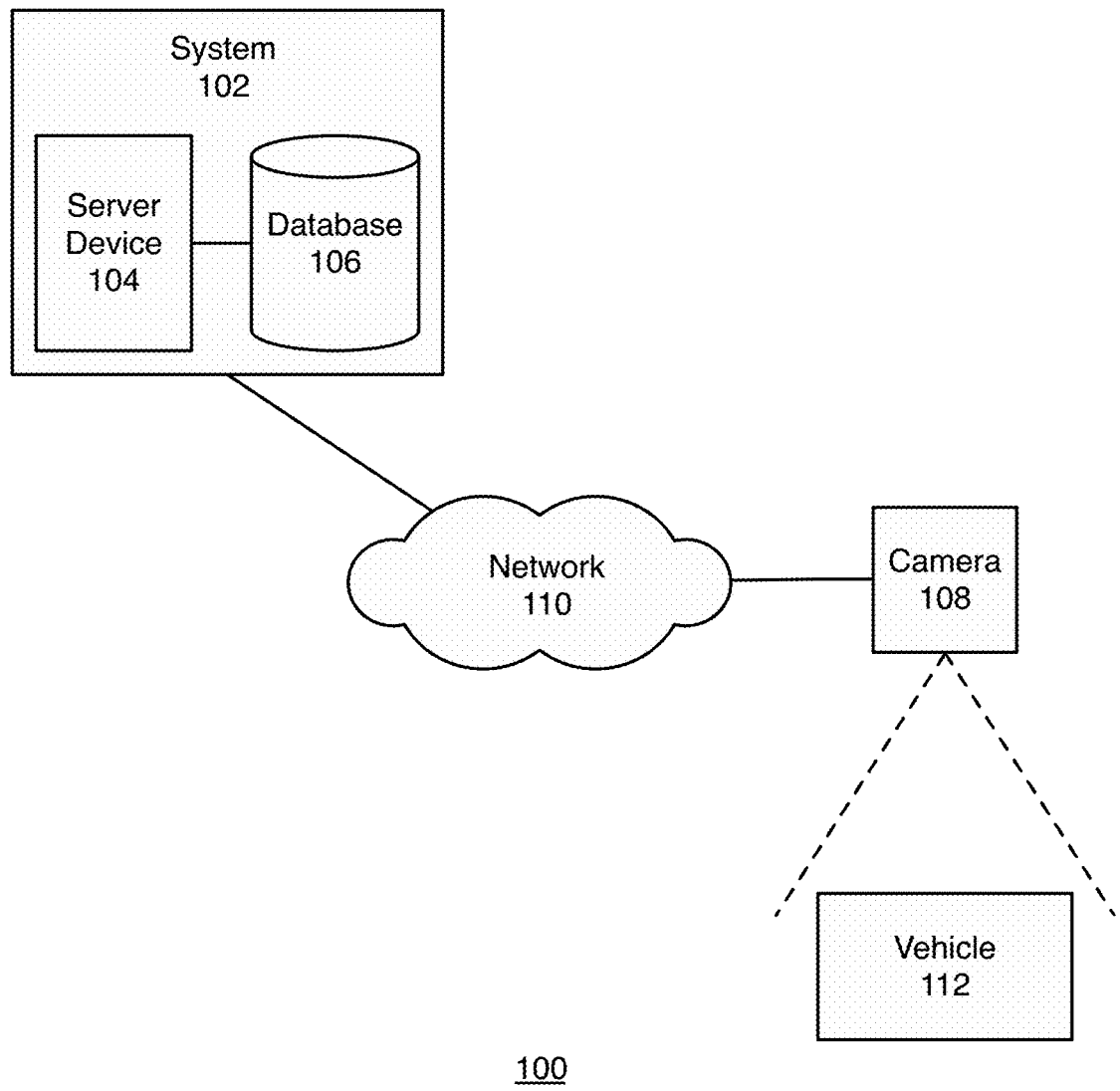
FIG. 1 illustrates a block diagram of an example environment, which may be used for some implementations described herein.

FIG. 1 illustrates a block diagram of an example environment 100, which may be used for some implementations described herein. In some implementations, environment 100 includes a system 102, which includes a server device 104 and a database 106. The system communicates with a camera 108 via a network 110.

As described in more detail herein, system 102 uses camera 108 to detect a vehicle 112. In various implementations, camera 108 may be located at different positions relative to vehicle 112. For example, camera 108 may be attached to or integrated with a drone in order to locate vehicles from the air. In another example, camera 108 may be in a helicopter, satellite, etc. Further example implementations are described in more detail herein.

In various implementations, system 102 may utilize various inference engines and libraries such as a deep neural network library and/or a compute library for deep neural networks, as well as various neural processors or graphical processor units (GPUs) for implementing implementations described herein. In various implementations, system 102 may utilize one or more GPU-accelerated libraries of primitives for deep neural networks. Such libraries may provide highly tuned implementations for routines associated with forward and backward convolution, pooling, normalization, and activation layers. The system may also utilize one or more compute and/or performance libraries for deep neural networks (clDNN). Such libraries provide highly optimized building blocks for implementation of convolutional neural networks. In the various implementations described herein, a processor of system 102 causes the elements described herein (e.g., vehicle information, etc.) to be displayed in a user interface on one or more display screens.

For ease of illustration, FIG. 1 shows one block for each of system 102, server device 104, database 106, camera 108, network 110, and vehicle 112. Blocks 102, 104, 106, 108, 110, and 112 may represent multiple systems, server devices, databases, cameras, networks, and vehicles. In other implementations, network environment 100 may not have all of the components shown and/or may have other elements including other types of elements instead of, or in addition to, those shown herein.

Implementations may apply to any network system and/or may apply locally for an individual user. System 102 may perform the implementations described herein on a stand-alone computer, tablet computer, smartphone, etc. System 102 may perform implementations described herein individually or in combination with other devices.

Figure 2:
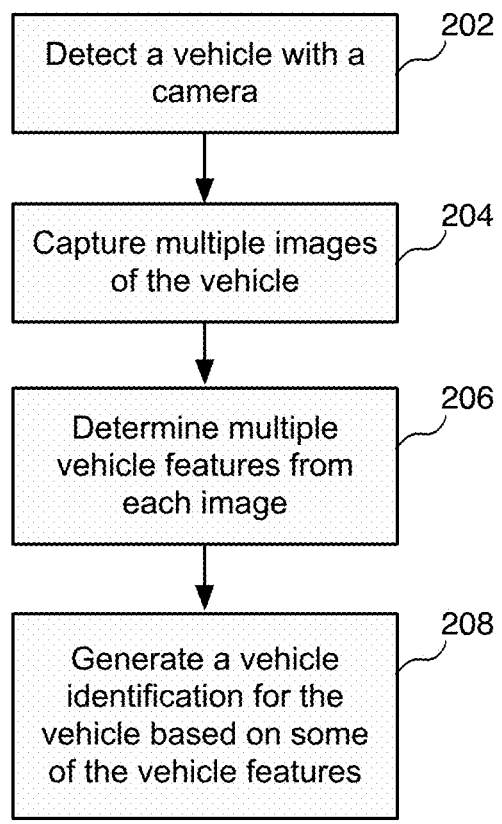
FIG. 2 illustrates an example flow diagram for identifying a vehicle, according to some implementations.

FIG. 2 illustrates an example flow diagram for identifying a vehicle, according to some implementations. Referring to both FIGS. 1 and 2, a method is initiated at block 202, where a system detects a vehicle with a camera. In various implementations, the system uses computer vision object detectors to initially detect the vehicle and generate or draw a bounding box around the vehicle.

The system may utilize cameras located at various locations relative to the vehicle. For example, as indicated herein, an aerial camera of a drone may be used to detect the vehicle. Other possible locations of cameras from above may include high locations on utility poles, on buildings, overpasses, etc.

Figure 3:
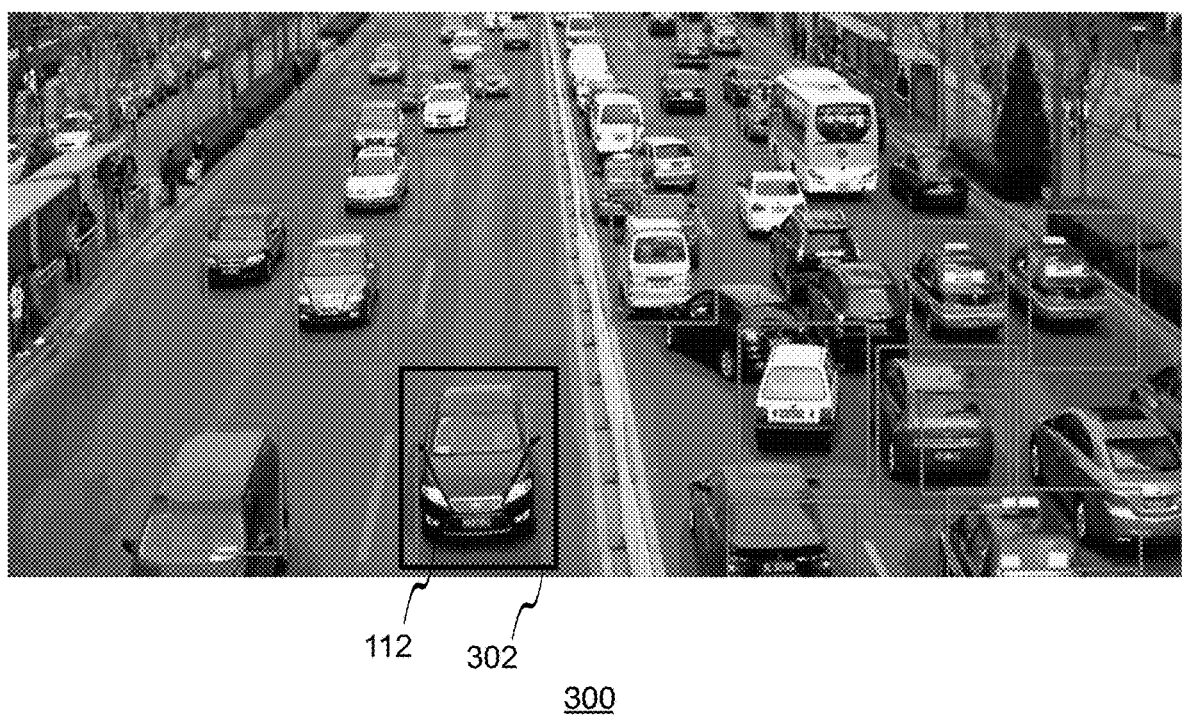
FIG. 3 illustrates an example image of a vehicle captured by a camera, according to some implementations.

FIG. 3 illustrates an example image 300 of a vehicle captured by a camera, according to some implementations. For example, the camera may be camera 108 of FIG. 1, where camera 108 is capturing an image of vehicle 112 among other vehicles on a freeway. In operation, camera 108 captures images, and system 102 generates boundary boxes such as boundary box 302. As shown, boundary box 302 surrounds or boxes vehicle 112. The system causes camera 108 to lock onto and track vehicle 112.

For ease of illustration, various implementations are described herein in the context of a vehicle 112. These implementations and others also apply to multiple vehicles. For example, in some scenarios, the system may track a single vehicle such as vehicle 112, where vehicle 112 is among many other vehicles. As such, for clarity, the vehicle of interest may be referred to as the target vehicle, especially where other non-target vehicles are mentioned. In other scenarios, the system may track multiple vehicles.

At block 204, the system captures multiple images of the vehicle. In some scenarios, the system may capture the multiple images using a single camera (e.g., a camera of a drone). While some implementations are described herein in the context of a single camera and a single perspective, these implementations and other also apply to contexts of multiple cameras and multiple perspectives. For example, in other scenarios, the system may capture some images using a first camera (e.g., a camera of a drone) and some images using one or more other cameras (e.g., a camera of a police car, a camera mounted on a utility pole, etc.).

In various implementations, the images captured by a given camera may be in the form of individual photos or a series of images of a video. As such, the system may use a combination of cameras to capture images from a combination of photos and videos. The multiple images may be captured by a rapid succession of photos or by video, depending on the particular implementation. Camera 108 then sends the multiple images to the system for processing. The number of images may vary depending on the particular implementation.

At block 206, the system determines multiple vehicle features from each image. Such vehicle features may include any visually detectible aspects of a vehicle. For example, in various implementations, vehicle features may include features on the exterior surface of the vehicle (e.g., roof, hood, front grill, wheels, etc.). In some implementations, vehicle features may include features in the interior of the vehicle and visible through the windows (e.g., front windshield, side/door windows, rear window, etc.).

Figure 4:
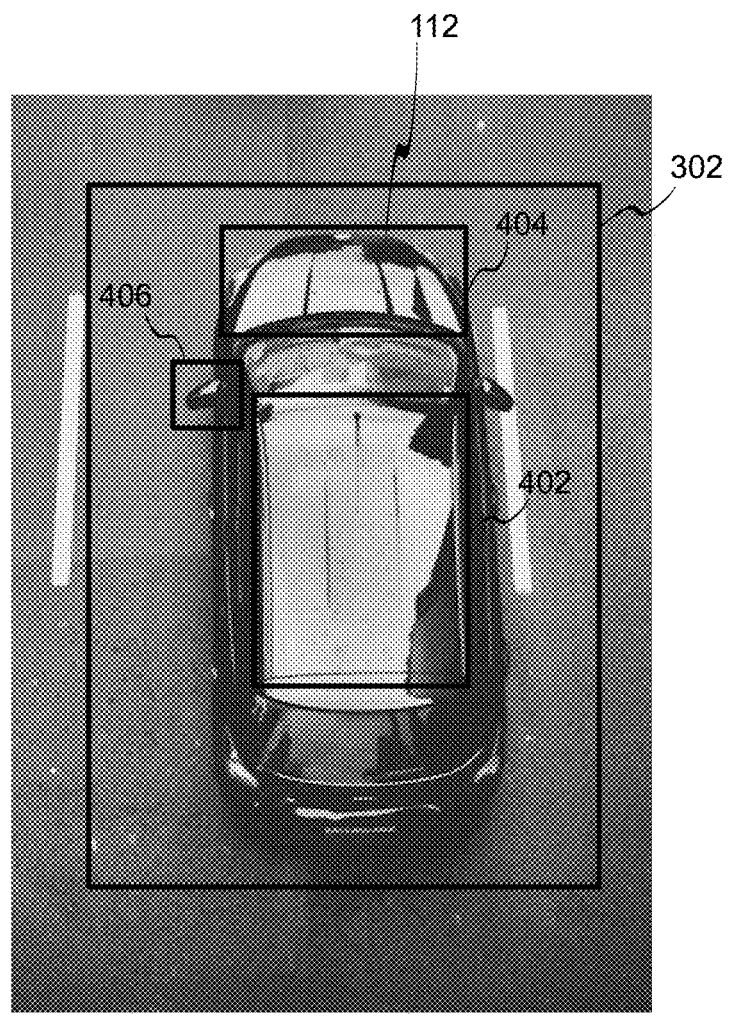
FIG. 4 illustrates an example image of a vehicle captured by a camera, according to some implementations.

FIG. 4 illustrates an example image 400 of a vehicle captured by a camera, according to some implementations. Shown in the particular example is vehicle 112 surrounded by boundary box 302. In various implementations, the system uses computer vision object detectors to initially detect each vehicle feature and then generate or draw a boundary box around each vehicle feature. Also shown are some example vehicle features surrounded by boundary boxes. For example, a boundary box 402 surrounds the roof of vehicle 112. Similarly, a boundary box 404 surrounds the hood of vehicle 112. A boundary box 406 surrounds the left-side-view mirror of vehicle 112. For ease of illustration, only boundary boxes 302, 402, 404, and 406 are shown. The system may generate other boundary boxes around other vehicle features. Further examples of vehicle features are described in more detail herein.

In some implementations, the vehicle features may include one or more top-view features. For example, top-view features may include the body, the roof, the front hood, the trunk hatch, the windows (e.g., windshield, rear window, side windows, sunroof or moon roof, etc.), the side-view mirrors, dents or other damage marks, etc. In some implementations, the system may generate or draw boundary boxes around each vehicle feature. The system causes camera 108 to lock onto and track each of the vehicle features.

In some implementations, the vehicle features may include one or more side-view features. For example, side-view features may include the body, the lights (e.g., turn signal lights, etc.), the windows, a side-view mirror, the side profile of the tires and wheels, dents or other damage marks, etc.

In various implementations, the side-view features may be grouped into left-side-view features and right-side-view features. In some implementations, the system may identify the front end and the rear end of the vehicle within the side-view for orientation purposes.

In some implementations, the vehicle features may include one or more front-view features. For example, front-view features may include the body, the front grille, the lights (e.g., headlights, turn signal lights, fog lights, etc.), the license plate and number, the bumper, the windshield, the side-view mirrors, the front profile of the tires, bumper stickers, dents or other damage marks, etc.

In some implementations, front-view features of the vehicle features may include one or more rear-view features. For example, rear-view features may include the body, the lights (e.g., break lights, turn signal lights, fog lights, etc.), the license plate and number, the bumper, the rear window, the trunk hatch, the side-view mirrors, the rear profile of the tires, bumper stickers, dents or other damage marks, etc.

In various implementations, each part or aspect of the vehicle may be detected as multiple different vehicle features, depending on the particular view point(s)/perspective(s). For example, the system may detect and identify the left-side-view mirror (driver-side view mirror), and may classify the left-side view mirror as a top-view vehicle feature, front-view vehicle feature, rear-view vehicle feature, left-side-view vehicle feature, and/or a right-side-view vehicle feature, depending on the perspective of the camera. This is because the camera of the system is able to capture the left-side-view mirror from the different perspectives, depending on the particular location of the camera at the times of capturing images. For example, if the vehicle is moving over a relatively long distance, there may be various turns and obstacles. Both the vehicle and camera (e.g., as a part of a drone) may need to navigate various different obstacles. As such, implementations support various arbitrary viewpoints of the vehicle while tracking the vehicle.

In various implementations, each feature includes one or more characteristics. For example, in some implementations, some of the characteristics may include shape, line contours, angles, etc. of the body of the vehicle and of each vehicle feature that the system detects. In various implementations, the characteristics may be from various different perspectives (e.g., top view, front view, rear view, side view). In some implementations, at least one of the characteristics may include color. In some implementations, at least one of the characteristics may include texture.

In various implementations, the system analyzes the vehicle features and their respective characteristics from various perspectives (e.g., top view, front view, rear view, side view). Considering the left-side-view mirror as a rear-view vehicle feature and as a top-view feature, the system detects and identifies the characteristics from the rear-perspective, which may include shape, color, etc. The color characteristics of the left-side-view mirror will be different as a rear-view feature compared to those as a top-view feature. For example, from the rear perspective (looking at the rear of the vehicle), the system may identify a first color for the edges of the left-side-view mirror. The system may also identify a second color for the center portion or mirror of the left-side-view mirror. In some implementations, the system may handle reflections on the surface of the vehicle by comparing multiple images of the same view taken not far apart time-wise. The system may further see which color changes are the result of reflections and which are constant (e.g., reflections on the ridges in the roof, etc.). In some implementations, the system may adjust for different light conditions such as sunlight and night changes in color of the vehicle.

At block 208, the system generates a vehicle ID for the vehicle based at least in part on some of the vehicle features. As indicated above, the system determines one or more characteristics for each vehicle feature that the system detects. The system then computes a vector for each vehicle feature in the images. The system then combines the vectors for the vehicle features into a single set of vectors. In various implementations, the vectors may be sets of floating point numbers. In some implementations, the set of vectors may be a string of vector numbers. In some implementations, the vectors may be organized in lists of a predetermined number (e.g., 256, etc.) of floating point numbers. In some implementations, the system may derive the vehicle ID from the vector numbers. In some implementations, the system may use string of vectors as the vehicle ID. In some implementations, vehicle ID may be a unique number (e.g., a 128-bit number) that the system generates in order to uniquely identify a particular vehicle. The vehicle ID provides many combinations. For example, the system may account for 2 to the power of 128 different vehicles. An example in hexadecimal may be 0x696f7565752069652Of697520656f69.

In various implementations, the system compares the vehicle ID of the target vehicle to the vehicle ID of other cars captured in the images. The system also compares the vectors in the vehicle ID of the target vehicle to the vectors of the vehicle ID of each of the other vehicles. If two vehicles are similar, they will have similar yet significantly different vectors. If two vehicles are dissimilar, they will have significantly different vectors. Such differences in vehicle IDs increase the confidence that a particular target vehicle is being accuracy tracked and not lost.

In some implementations, the system minimizes loss of tracking of a target vehicle by optimizing the vectors for different vehicles such that different vehicles have greater Euclidean L2 distance than similar vehicles. In some embodiments, the system uses the Euclidean L2 norm to calculate how close the two vectors are, and to decide if vehicles are similar or different. The resulting L2 distances in the embedding space directly correspond to vehicles similarity. The system enables the training of similar and different vehicle datasets captured from different viewpoints.

In various implementations, the system enables training of a deep neural network or deep convulsion neural network using similar and/or different vehicle datasets captured from different viewpoints. In various implementations, the system reduces loss by optimization to maximize differences between the target vehicle and non-similar vehicles.

As indicated above, the system generates the vehicle ID for the vehicle based at least in part on some of the vehicle features. For a given set of images, there may be at least 8 top-view vehicle features (e.g., the body, the roof, the front hood, the trunk hatch, the windshield, the rear window, the left-side-view mirror, and the right side-view mirror). As such, the system generates a vehicle ID based on the 8 existing vehicle features. For a subsequent set of images, there may be 3 additional vehicle features added (e.g., 3 windows on left side of the car, yet still classified as top-view features). As such, the system generates a new vehicle ID for the same vehicle based on the now 11 existing vehicle features. In various implementations, the system may continuously update the vehicle ID to take into account newly captured images.

As indicated above, the vectors of the vehicle ID may vary for the same vehicle, especially as more images and more vehicle features are used to update one or more vehicle IDs associated with the same vehicle. Even though the vehicle IDs may vary, they will be substantially close such that the system recognizes the same vehicle. This may be due to the fact that the vector associated with the same vehicle feature (e.g., windshield) will be substantially the same from vehicle ID to vehicle ID of the same vehicle. Adding a new vehicle feature may alter the vehicle ID, but primarily the portion of the vehicle ID that includes the vector associated with the windshield.

In some implementations, if the difference between two vehicle IDs is below a predefined threshold, the system may deem the two vehicle IDs as being associated with the same vehicle. Conversely, if the difference between two vehicle IDs is above the predefined threshold, the system may deem the two vehicle IDs as being associated with two different vehicles. In some implementations, the system may provide a user interface that shows example vehicle images associated each vehicle IDs. The system may enable a user to accept or reject one or more of the vehicle images. Receiving such feedback from a user to confirm accuracy of the vehicle IDs facilitates the system in generating accurate vehicle IDs.

In some implementations, the system may perform clustering of vehicle features of the same vehicle captured in different image frames. For example, as described above with respect to the different possible categories of features (e.g., top-view features, front-view features, rear-view features, left-side-view features, and right-side-view features), the system may group of the top-view features, group all of the front-view features, group all of the rear-view features, group all of the left-side-view features, and group all of the right-side-view features.

In various implementations, by clustering the vehicle features and associated vectors, the system may generate multiple vehicle IDs for the same vehicle. For example, for the same vehicle, the system may generate a top-view vehicle ID corresponding to the vectors of the top-view features. For the same vehicle, the system may generate a rear-view vehicle ID corresponding to the vectors of the rear-view features. The system may continue to generate different vehicle IDs for different perspectives as the system captures more images. This enables the system to accurately compare the target vehicle with other vehicles from similar perspectives (e.g., all form above, all from the rear, etc.). Also, if the perspective of the target vehicle changes (e.g. from a top-view to a rear-view or side-view, etc.), the system will have different vehicle IDs for the same target vehicle. In some implementations, the system may track the centroid of a cluster when comparing a target vehicle to other vehicles. The centroid of the cluster will remain substantially constant for the same vehicle and different for two different vehicles, which enables the system to distinguish between two different vehicles.

In various implementations, the vehicle ID enables the system to discover the same target vehicle entering a new scene. For example, the same camera or a different camera may detect the vehicle entering the scene (e.g., in a new geographic area) and then recognize the vehicle based on the appropriate vehicle ID. For example, if the system captures images of the top of the vehicle, the system may recognize the vehicle based on a top-view vehicle ID based on the top-view features detected.

By generating potentially multiple vehicle IDs for multiple viewpoints, the system increases the accuracy of tracking a given target vehicle. For example, a given drone with a camera may detect the same vehicle whether approaching the vehicle from the top, the front, the rear, the left side, the right side, etc. Adding or augmenting an existing vehicle ID with multiple vehicle IDs further increases the system's accuracy in detecting and tracking a target vehicle among other vehicles.

The system may track a given vehicle in a non-continuous manner at different times and different locations and using different cameras. For example, if vehicle 112 is involved in a police car chase, the system may initially track vehicle 112 in a particular neighborhood. If the system loses track of vehicle 112 (e.g., vehicle 112 drives into a parking structure), the system may later detect vehicle 112 in a different location. For example, if vehicle 112 drives into a parking structure on one street and then drives out of the parking structure on another street, the system may find vehicle 112 again via another camera at a later time.

In various implementations, the system may identify and track a given vehicle in various scenarios/applications. For example, in some implementations, the system may track a target vehicle in a group of vehicles. In some implementations, the system may identify pre-enrolled suspect cars. In another example application, the system may track all cars that enter and leave a particular geographic area (e.g., neighborhood). The vehicle IDs enable the system to determine which vehicles come and go from the geographic area. Such information on the vehicles may be used to determine traffic patterns and to make improvements to traffic (e.g., installing speed bumps, stop signs, etc.). The system may also determine the number of vehicles leaving the geographic area and the number vehicles entering the geographic area. Using the vehicle IDs, the system may determine if the same vehicle comes and goes, etc.

As a result, the system provides increased discriminatory power that differentiates between cars. The system efficiently tracks selected cars with high accuracy and speed. The system also tracks cars even when license plates are not visible.

In various implementations, the system calculates a unique vehicle ID using a deep neural network. In some implementations, such as a neural network may also be a convolutional neural network.

In various implementations, the system takes advantage of the scale invariance property of convolutional networks, where the system recognizes vehicles from near views or far views (e.g., when a camera associated with the system zooms in or out or when a camera gets closer distance-wise to a particular vehicle).

Alignment and perspective transformation or lens distortion corrections can improve accuracy. In some embodiments, the system may take into account various distortions that may occur and improve recognition accuracy. For example, if there is much lens distortion due to the camera lenses being wide angle like a fish eye, the network may be re-trained, and the system may apply augmentation for the particular type of distortion. Similarly, if the system determines that a particular camera is mounted at a certain angle that causes captured frames to have a certain perspective, the system may compensate by applying reverse projective transformation during the training of the network.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations provide new ways of calculating unique vehicle IDs. Implementations also provide increased discriminatory power that differentiates between cars. Implementations also efficiently track selected vehicles with high accuracy and speed. Implementations also enable the tracking of one or more vehicles using drones.

Figure 5:
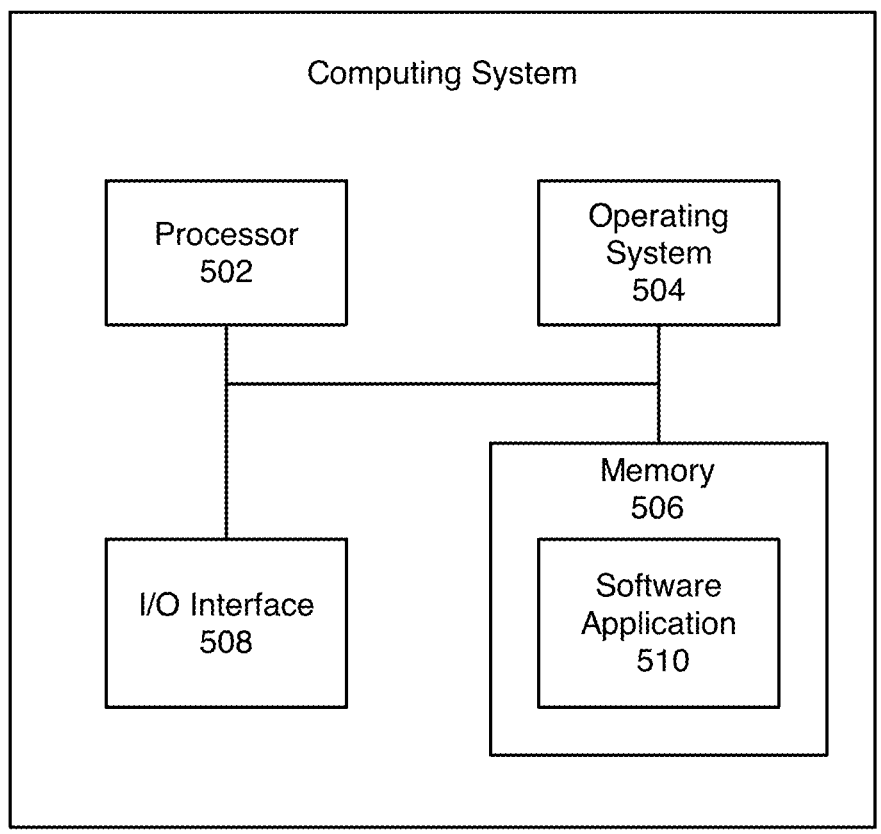
FIG. 5 illustrates a block diagram of an example computing system, which may be used for some implementations described herein.

FIG. 5 illustrates a block diagram of an example computing system 500, which may be used for some implementations described herein. For example, computing system 500 may be used to implement system 102 of FIG. 1, as well as to perform implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computing system 500 or any suitable processor or processors associated with computing system 500 or any suitable system may perform the steps described. Implementations described herein may be carried out on a user device, on a server, or a combination of both.

Computing system 500 also includes a software application 510, which may be stored on memory 506 or on any other suitable storage location or computer-readable medium. Software application 510 provides instructions that enable processor 502 to perform the implementations described herein and other functions. Software application may also include an engine such as a network engine for performing various functions associated with one or more networks and network communications. The components of computing system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
detecting a vehicle with a camera;
capturing a plurality of images of the vehicle using the camera;
determining a plurality of vehicle features of different portions of the vehicle from each image of the plurality of images, wherein the different portions comprise one or more of a body, a roof, a front hood, and a windshield, wherein each vehicle feature comprises one or more characteristics, and wherein at least one of the characteristics comprises texture;
computing a vector for each vehicle feature of the plurality of vehicle features;
combining the computed vectors into a string of vector numbers; and
generating a vehicle identification for the vehicle from the string of vector numbers.

2. The system of claim 1, wherein the plurality of vehicle features comprises one or more top-view features.

3. The system of claim 1, wherein the plurality of vehicle features comprises one or more side-view features.

4. The system of claim 1, wherein the plurality of vehicle features comprises one or more front-view features.

5. The system of claim 1, wherein the plurality of vehicle features comprises one or more rear-view features.

6. The system of claim 1, wherein the logic when executed is further operable to cause the one or more processors to perform operations comprising analyzing one or more vehicle features of the plurality of vehicle features from a plurality of different perspectives, and wherein at least one of the one or more characteristics comprises shape of the vehicle.

7. The system of claim 1, wherein at least one of the one or more characteristics comprises color of the vehicle.

8. A non-transitory computer-readable storage medium with program instructions stored thereon, the program instructions when executed by one or more processors are operable to cause the one or more processors to perform operations comprising:
detecting a vehicle with a camera;
capturing a plurality of images of the vehicle using the camera;
determining a plurality of vehicle features of different portions of the vehicle from each image of the plurality of images, wherein the different portions comprise one or more of a body, a roof, a front hood, and a windshield, wherein each vehicle feature comprises one or more characteristics, and wherein at least one of the characteristics comprises texture;
computing a vector for each vehicle feature of the plurality of vehicle features;
combining the computed vectors into a string of vector numbers; and
generating a vehicle identification for the vehicle from the string of vector numbers.

9. The computer-readable storage medium of claim 8, wherein the plurality of vehicle features comprises one or more top-view features.

10. The computer-readable storage medium of claim 8, wherein the plurality of vehicle features comprises one or more side-view features.

11. The computer-readable storage medium of claim 8, wherein the plurality of vehicle features comprises one or more front-view features.

12. The computer-readable storage medium of claim 8, wherein the plurality of vehicle features comprises one or more rear-view features.

13. The computer-readable storage medium of claim 8, wherein at least one of the one or more characteristics comprises shape of the vehicle.

14. The computer-readable storage medium of claim 8, wherein at least one of the one or more characteristics comprises color of the vehicle.

15. A computer-implemented method when executed by one or more processors to cause the one or more processors to perform operations comprising:
detecting a vehicle with a camera;
capturing a plurality of images of the vehicle using the camera;
determining a plurality of vehicle features of different portions of the vehicle from each image of the plurality of images, wherein the different portions comprise one or more of a body, a roof, a front hood, and a windshield, wherein each vehicle feature comprises one or more characteristics, and wherein at least one of the characteristics comprises texture;
computing a vector for each vehicle feature of the plurality of vehicle features;
combining the computed vectors into a string of vector numbers; and
generating a vehicle identification for the vehicle from the string of vector numbers.

16. The method of claim 15, wherein the plurality of vehicle features comprises one or more top-view features.

17. The method of claim 15, wherein the plurality of vehicle features comprises one or more side-view features.

18. The method of claim 15, wherein the plurality of vehicle features comprises one or more front-view features.

19. The method of claim 15, wherein the plurality of vehicle features comprises one or more rear-view features.

20. The method of claim 15, wherein at least one of the one or more characteristics comprises shape of the vehicle.

* * * * *